(No Model.) 4 Sheets—Sheet 1.

J. F. GUILMARTIN.
SEED PLANTER.

No. 376,243. Patented Jan. 10, 1888.

Witnesses
Chas. J. Williamson
Henry C. Hazard

Inventor
John F. Guilmartin
by Prindle and Russell
his Attorneys

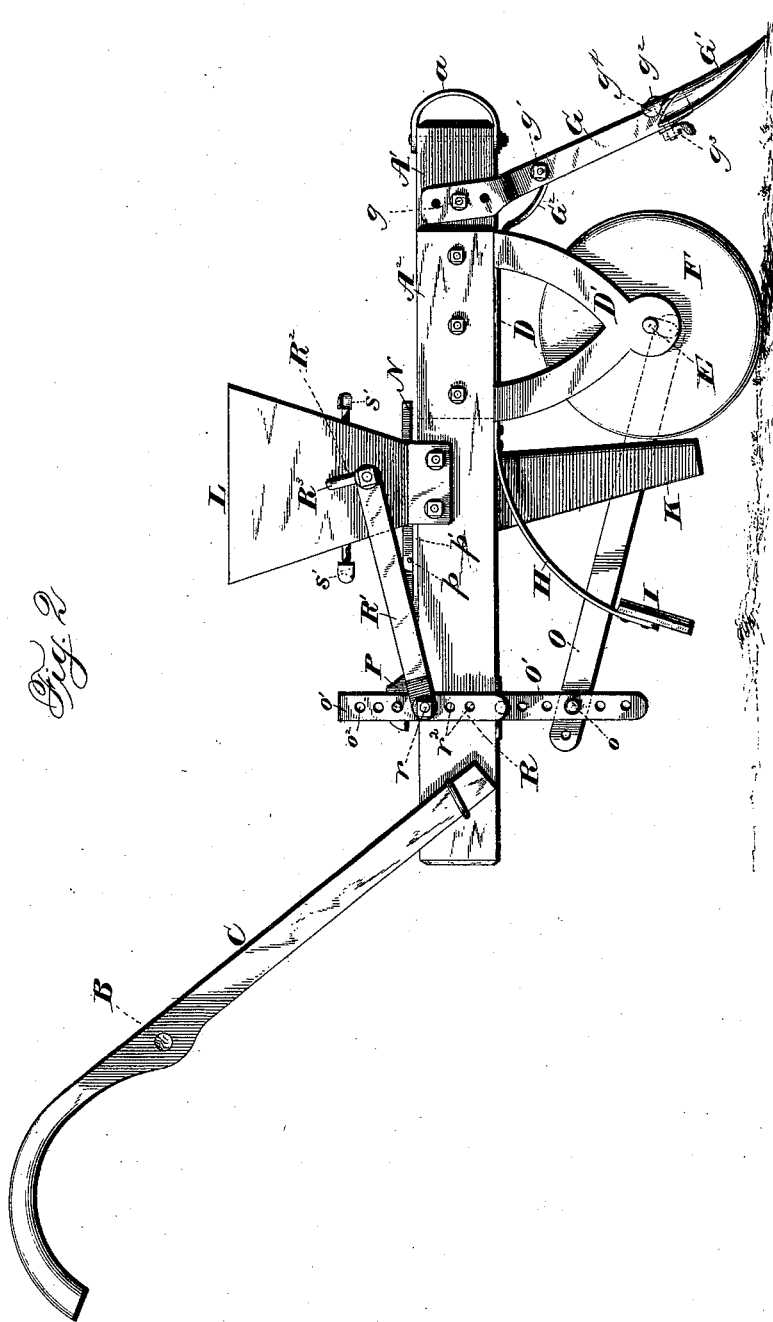

(No Model.)　　　　　　　　　　　　　　　　　　4 Sheets—Sheet 3.
J. F. GUILMARTIN.
SEED PLANTER.
No. 376,243.　　　　　　　　　　　Patented Jan. 10, 1888.
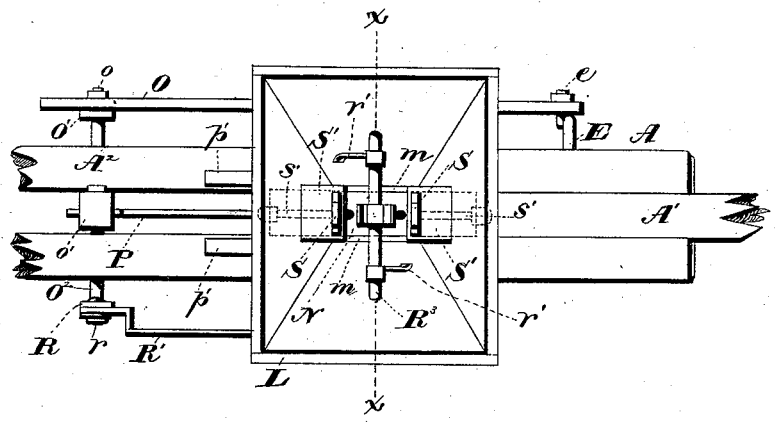
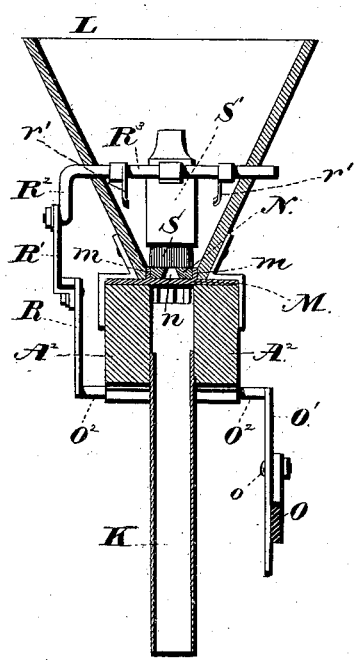

(No Model.) 4 Sheets—Sheet 4.

J. F. GUILMARTIN.
SEED PLANTER.

No. 376,243. Patented Jan. 10, 1888.

Witnesses
Chas. J. Williamson
Henry C. Hazard

Inventor
John F. Guilmartin
by Prindle & Russell
his Attorneys

UNITED STATES PATENT OFFICE.

JOHN F. GUILMARTIN, OF TROY, ALABAMA, ASSIGNOR TO E. T. COMER, OF SAVANNAH, GEORGIA.

SEED-PLANTER.

SPECIFICATION forming part of Letters Patent No. 376,243, dated January 10, 1888.

Application filed September 23, 1886. Serial No. 214,335. (No model.)

*To all whom it may concern:*

Be it known that I, JOHN F. GUILMARTIN, of Troy, in the county of Pike, and in the State of Alabama, have invented certain new and useful Improvements in Seed-Planters; and I do hereby declare that the following is a full, clear, and exact description thereof, reference being had to the accompanying drawings, in which—

Figure 1:
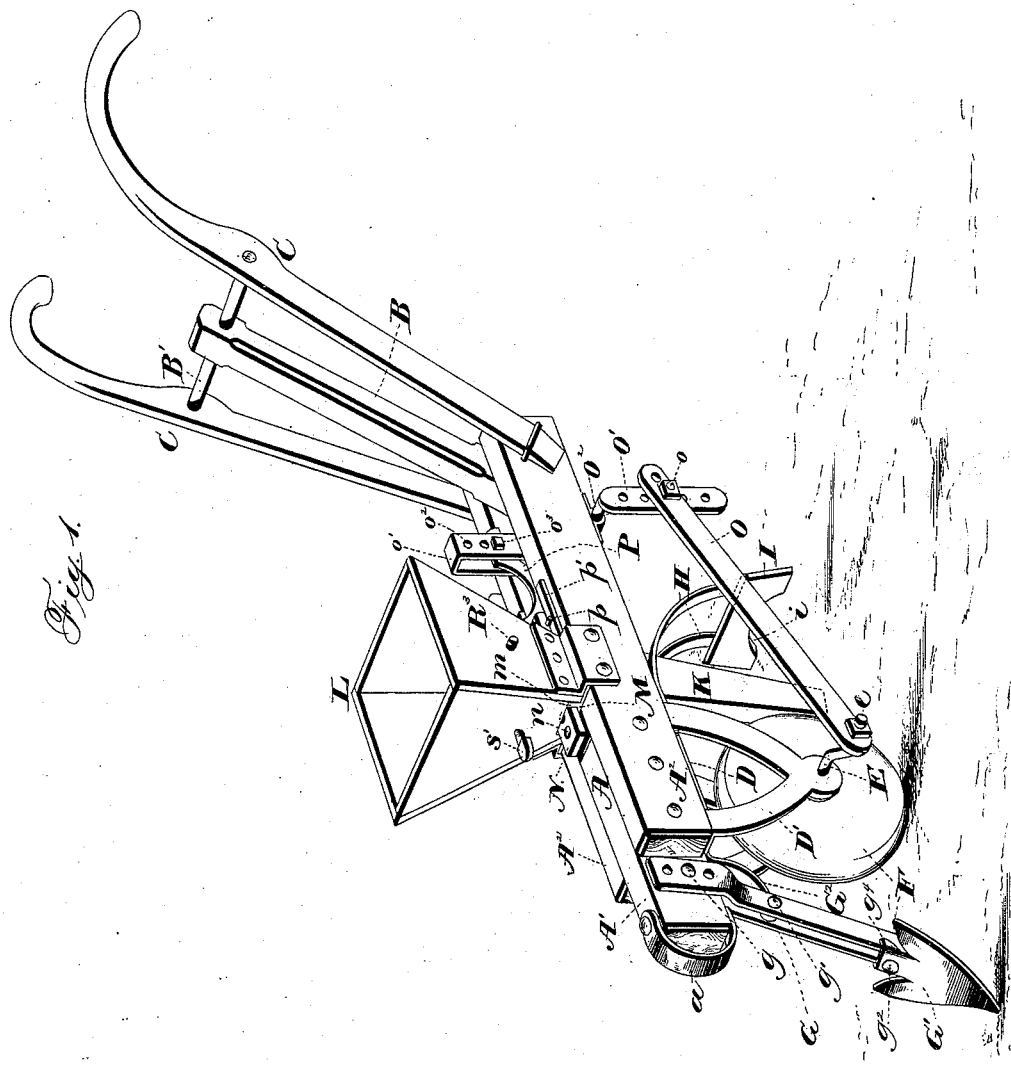
Figure 5:
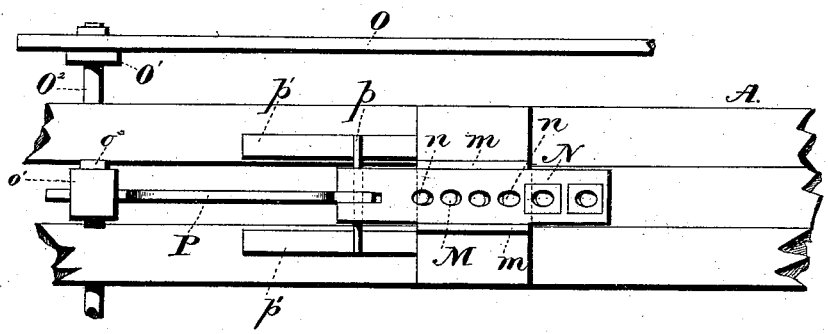
Figure 6:
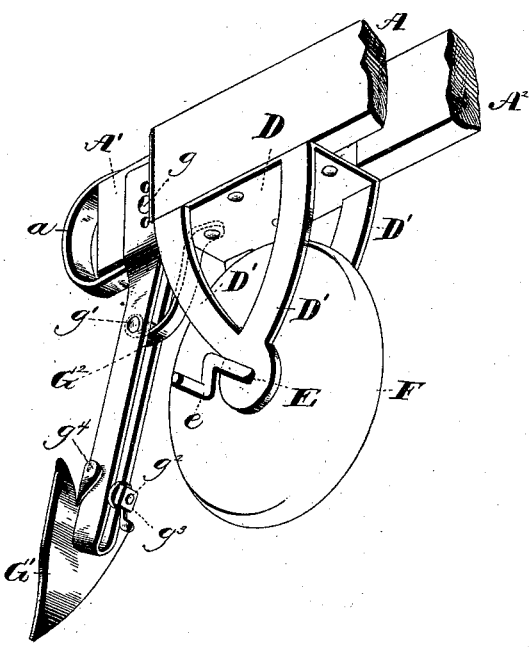

Figure 1 shows a perspective view of my machine; Fig. 2, a view of the same in side elevation, showing the side opposite to that shown in Fig. 1; Fig. 3, a detail plan view of the hopper and connected delivery devices; Fig. 4, a vertical section on line $x\ x$ of Fig. 3; Fig. 5, a detail plan view of the delivery-slide and its operating devices, and Fig. 6 a detail bottom perspective view showing the manner and means of journaling the supporting-wheel to the frame and attaching the opening-hoe.

Letters of like name and kind refer to like parts in each of the figures.

The object of my invention is to provide an improved planter and seed-distributer; and to this end my invention consists in the planter and the construction, arrangement, and combination of parts, as hereinafter specified.

In the drawings, A designates the beam or main portion of the frame of my machine. As shown, this is preferably made of three parts bolted together. These are the central forward part, A', to which is attached the loop $a$, to which a clevis, pole, or other means of connecting the draft-power can be attached, and the two parallel side pieces, $A^2\ A^2$, attached to opposite sides of piece A' at their forward ends. Between the rear ends of these side pieces, $A^2\ A^2$, is fastened the lower end of the upward and rearwardly-extending brace or bar B, through which passes the cross-bar B', fixed or attached at opposite ends to the handles C C. The lower ends of these handles are, as shown, attached to the outer sides of the rear ends of side pieces, $A^2\ A^2$.

If desired, the beam or main frame A can be made of one piece having a central longitudinal slot or way to correspond with the space between the two side pieces, $A^2\ A^2$. The handles C C, which are substantially like ordinary plow-handles, could then be attached as already described, or in any other desired way.

Fastened to the bottom of beam or frame A, near its front end, is the plate D, having the arms D' D' extending downward from its opposite sides, in which arms is journaled the shaft E of the supporting-wheel F, which latter is situated and rotates centrally between said arms.

Attached to the beam A, forward of the wheel F, is the shank G, for the attachment of the furrow-opening hoe or shovel G', of the ordinary and well-known form. This shank preferably consists, as shown, of the long U-shaped piece of metal, whose upper ends are fastened by means of a bolt, $g$, on opposite sides of the forward end of the central forward part, A', of the frame. The bolt passes through such part and the two arms of the U-shaped piece. Lower down a pin or cross-bar, $g'$, connects the two sides or legs of this piece, and to such pin is attached the lower end of brace $G^2$, attached to the beam A.

The hoe G' is attached to its shank by means of the bolt $g^2$, passing through the hoe rearward between the sides of the shank, and provided on its rear end with the nut $g^3$, engaging the rear side of the shank, or a washer, $g^3$, pressed against such shank. The upper end of the hoe is preferably bent rearward on each side to form lips $g^4\ g^4$, engaging and embracing the shank on opposite sides.

With the construction described the hoe can obviously be adjusted up or down the shank by loosening the nut, moving the hoe, and tightening the nut again. The adjustment of the shank itself with reference to the beam or main frame is provided for by making a series of opposite holes in the upper end of the shank-sides, through any of which the attaching-bolt $g$ can be passed.

The edge or tread of wheel F is preferably rounded, as shown, so as to run easily in the furrow or groove cut by the hoe when the machine is in operation. With its rounded tread the wheel will not tend to scrape or cause the earth on each side of the furrow to fall back into the furrow.

Attached to the beam by the two shanks H H is the covering-scraper I in rear of the wheel F. Such scraper has the middle portion of its lower edge cut away, as shown, to form the arched rabbet or notch $i$, whose front edge is beveled, so as to turn the earth thrown up on each side of the furrow back into the latter. Just in rear of the wheel F, and between it and the covering-scraper, is the seed-conducting spout K, adapted to take the seeds delivered from the hopper L and discharge them into the furrow behind the wheel, where they are then covered by the turning in of the earth by the scraper or coverer I, described above.

Attached to the top of the beam A, and extending across the central opening or way in the same over the mouth of the spout K, is the plate M, having on its upper side the upright and parallel ribs $m$ $m$, forming a slideway for the sliding bar N, provided with the series of holes $n$ $n$. Likewise, fastened on top of beam A is the hopper L, already referred to, having its lower end formed so as to embrace the slideway and leave space for the reciprocation of slide N therein.

On the shaft E of wheel F is a crank, $e$, on which is pivoted one end of pitman or connecting-rod O, whose other end is connected by means of pin $o$ with the crank-arm O' on shaft $O^2$, journaled on bearings on the under side and near the rear end of the frame. This shaft is formed with the inverted-U-shaped offset or bend $o'$, which projects up through the central opening in the frame and swings therein as the shaft $O^2$ is rocked through the crank $e$, rod O, pin $o$, and crank-arm O' when the wheel F rotates. The opposite sides of this bend in the shaft are provided with series of corresponding holes, $o^2$ $o^2$, for the reception of pin $o^3$, upon which is pivoted the rear end of the connecting-rod P, whose forward end is pivoted to the slide N by the pin $p$. Such pin projects beyond the opposite sides of the slide and slides on metal ways or bearing-plates $p'$ $p'$ on the beam A.

The rod P is preferably bent downward and then upward, as shown, as such construction has been found to insure the free and easy driving of the slide without bending as the crank-bend $o'$ is swung back and forth, and as the rod so made is less in the way of anything above the beam than a straight rod would be.

The crank-arm O' is provided with a series of holes, in any one of which the pin $o$ can be fastened, according to the desired length of stroke of such crank. The rod O is also provided with several holes, in either of which the pin $o$ can be placed to regulate the action of the crank-arm.

With the construction described above the length of stroke of the slide M can be easily and quickly changed and regulated, either by placing the pin $o$ in a different hole in the crank-arm O' or by putting the pin $o^3$ through holes in the crank-bend nearer to or farther from the axis of the rock-shaft $O^2$. On the end of this shaft, opposite to arm O', is the crank-arm R, upon whose pin $r$ is pivoted the rear end of the connecting-rod R'. The forward end of said rod is connected by means of crank $R^2$ with shaft $R^3$, passing from side to side through the hopper L. This shaft within the hopper is provided with the stirring-arms $r'$ $r'$, adapted as the shaft is rocked to stir and loosen the contents of the hopper, so that they will pass freely down to the feed-slide N and will not clog in the hopper. Said arms can obviously be of any desired form or shape.

To enable the throw of the stirrer-shaft to be regulated without changing the throw of the shaft $O^2$, the crank-arm R is provided with several holes, $r^2$ $r^2$, in any one of which the crank-pin $r$ can be put as desired. The holes $n$ $n$ in the slide are made slightly larger at their lower ends than above, so that any seed falling from the hopper L into the holes can fall freely down and out when the holes are carried beyond the slideway bottom by the motion of the slide. I contemplate also making the holes slightly oval or elliptical in shape—that is, longer than they are wide—especially where the seeds being planted are irregular in size.

The feed-slide can be made of any length and provided with any number, size, and shape of holes to suit the seed to be planted. On the upper face of the slide the rear ends of the forward holes and the forward ends of the rear holes in the series $n$ $n$ are beveled or inclined, as shown, for a purpose to be set forth.

Within the hopper at its forward and rear sides are the brushes S S, whose bristles bear upon the top of the slide N and brush from the top of the holes $n$ $n$, before they are carried outside of the hopper by the motion of the slide, any seeds that project at all above the tops of the holes. The beveling of the upper ends of the holes, as described hereinbefore, facilitates this brushing away of the projecting seeds. The brushes are preferably held in upright sockets S' S' within the hopper by means of set-screws $s$ $s$, passing inward through the hopper sides and engaging the brush stocks or handles. With this construction the height of the brushes with reference to the feed-slide can be properly adjusted so that they will best clear off and even the seeds at the tops of the openings.

Obviously the hopper, the slide, and the openings in the latter can be changed in size, so as to suit the machine for planting any kind of seed.

If desired, the beam or frame can be made broader and be provided with gangs or series of hopper-slides, opening-hoes, feed-spouts, and covering devices.

As indicated in Fig. 5, the feed-slide can be adapted for use with any seed by making the holes $n$ $n$ quite large and providing plugs with seed-holes in them adapted to be fitted into holes $n$ $n$ in the slide. The slide can be changed at any time to suit it for different seed by taking out these plugs and putting in others with holes of suitable size.

It will be observed that the slide feeds seed from both the forward and rear sides of the hopper, the holes n n near the front end of the slide carrying the seed out through the front of the hopper to drop them into spout K, and the holes near the rear end of the slide carrying and dropping the seed into the spout in rear of the hopper. The slide can then be made to feed only when it moves one way by plugging up the holes near its other ends. With the slideway bottom engaging the under side of the slide, the seed are kept in the holes n n until they have passed out and away from the bottom of the hopper.

The operation of my invention is briefly as follows: While the machine is in action the hoe opens or cuts a furrow along which the wheel F runs. As this wheel revolves, the stirrer-shaft in the hopper stirs up the seed therein, so that they feed freely down onto the slide N and into the seed-holes in such slide. As the slide is reciprocated, the brushes S S brush any projecting seed away from the tops of the holes, so that the slide can move without danger of clogging out through and beyond the hopper. The slideway bottom holds the seed in the holes until such holes have been moved entirely out of the hopper, when, the holes having been covered beyond the way bottom, the seed fall freely out and down into spout K, by which they are delivered into the furrow behind wheel F. The covering-scraper I then turns the earth in again onto the seed. By regulating the throw of the actuating mechanism, as hereinbefore described, the play of the slide can be adjusted so that fewer or more of the feed-holes therein will be carried beyond the hopper and slideway bottom.

The arms supporting the covering-scraper are preferably made light, so as to have some spring action and yield slightly.

The machine can obviously be used either for planting seed or distributing fertilizer.

As indicated in my other pending application, Serial No. 203,019, a planting or seed-distributing mechanism can be placed on the supporting-frame of the plow shown and described in such application, and be driven by suitable connecting mechanism from one of the supporting-wheels. The seed-feeding mechanism shown and described in the present application is obviously well adapted to be so placed and operated.

The stirrer or agitator within the hopper is especially designed for use when the machine is being used for planting cotton-seed or distributing guano or other fertilizer. With other seed it can be removed or dispensed with, as desired.

Having thus described my invention, what I claim is—

1. In combination with the U-shaped shank, the opening-hoe having its upper portion bent to engage the shank on opposite sides, the bolt passing through the hoe and rearward between the sides of the shank, and the nut on the bolt, substantially as and for the purpose shown.

2. In a planter and distributer, as means for operating the delivery devices, the wheel, the crank on the shaft thereof, the connecting-rod, the rock-shaft, the crank thereon, with which the rod is connected, the crank-bend in the shaft, and the pitman or connecting-rod connecting such bend with the delivery mechanism, substantially as and for the purpose specified.

3. In combination with the delivery-slide, the connecting-rod or pitman, the crank, the rock-shaft carrying such crank, the crank-arm on the shaft provided with several holes for the crank-pin, the pin and the connecting-rod operated from the driving-wheel by suitable connecting mechanism, substantially as and for the purpose shown.

4. In combination with the rock-shaft provided with the crank-bend, the pitman or connecting-rod carried with such bend, and the delivery-slide pivotally connected with the rod, substantially as and for the purpose set forth.

5. In combination with the delivery-slide, the rock-shaft having the crank-bend provided with series of opposite holes for the reception of a pin, and the pitman or connecting-rod connected with the slide by a pin, and with the crank-bend by a pin passing through holes in the opposite sides of the bend, substantially as and for the purpose described.

6. In combination with the hopper, the rock-shaft, the crank thereon connected with the feed-slide, so as to operate the same, the stirrer-shaft, and the second crank on the rock-shaft connected with such stirrer-shaft, substantially as and for the purpose shown.

7. In combination with the hopper, the feed-slide provided with a series of openings adapted to be carried into and beyond the hopper as the slide reciprocates, and having the rear sides of their upper ends beveled, and means for brushing any projecting seed from the tops of the openings, substantially as and for the purpose specified.

8. In combination with the hopper and the slide provided with openings beveled on their rear sides at their upper ends, a brush engaging the top of the slide within the hopper, substantially as and for the purpose shown.

9. In combination with the hopper, the slide reciprocating through the hopper so as to be carried beyond opposite sides thereof, and having a series of seed-receiving openings beveled at their upper ends on the sides toward the middle of the slide, and the two brushes engaging the upper face of the slide within the hopper, substantially as and for the purpose set forth.

10. In combination with the hopper, the slide moving through the same beyond the front and rear sides thereof and provided with openings beveled at their upper ends on their rear sides with reference to their motion beyond the hopper, and the two brushes within the hopper at its front and rear sides, adapted to brush the projecting seed from the openings in the slide before such openings pass beyond the hopper, substantially as and for the purpose shown.

In testimony that I claim the foregoing I have hereunto set my hand this 29th day of March, 1886.

J. F. GUILMARTIN.

Witnesses:
B. W. STARKE,
O. WORTHY.